Patented Jan. 7, 1930

1,743,003

UNITED STATES PATENT OFFICE

SWIGEL POSTERNAK AND THÉODORE POSTERNAK, OF CHENE-BOUGERIES, NEAR GENEVA, SWITZERLAND, ASSIGNORS TO THE FIRM SOCIETY OF CHEMICAL INDUSTRY IN BASLE, OF BASEL, SWITZERLAND

PHOSPHORUS COMPOUND FROM ANIMAL PROTEIDS AND PROCESS OF MANUFACTURE THEREOF

No Drawing. Application filed March 21, 1927, Serial No. 177,222, and in Switzerland March 31 1926.

The present invention relates to new phosphorus compounds from the proteids of egg yolk, said compounds being useful in therapeutics, for instance as tonics, and it comprises the new compounds themselves as well as the process of their manufacture.

In the U. S. Patent No. 1,690,752 a process is described according to which, by subjecting egg yolk in succession to a peptic and tryptic digestion, mixtures of the phosphorus compounds of the proteids contained in egg yolk are obtained which may be isolated in the free form or as salts.

The present invention relates to a process for separating these phosphorus compounds, which have been distinguished in the said specification by the letters $\alpha$, $\beta$ and $\gamma$, from each other and obtaining each in the free state or in form of salts.

The phosphorus compound $\alpha$ is only slightly soluble in cold water and completely insoluble in solutions of inorganic salts made acid with mineral acids, by which salts it is therefore easily precipitated. It forms soluble alkali salts and insoluble alkali earth salts. It contains phosphorus and nitrogen in the atomic ratio of 1:1.75 to 1:2. It yields a fine Biuret-reaction but no Millon's-reaction or Molisch-reaction. By hydrolyzing it with boiling mineral acids there are obtained quantitatively $2NH_3$, 3 serines, 1 lysin and an acid containing 6 carbon atoms. This is the more remarkable since none of the many authors who have busied themselves with the degradation products of vitellin have succeeded in isolating serine (Abderhalden and Hunter, Ztsch. f. Physiol. Chem. vol. 48, page 505 [1906]; Osborne and Jones, Am. Journ. of Physiol. 24, page 173 [1906]; Levene and Alsberg, Journ. Biolog. Chem. vol. 2, page 217 [1906]). The four phosphoric acid groups are apparently esterified with the hydroxyl groups of the 3 serines and of the acid containing 6 carbon atoms. The phosphorus content of the compound moves between 12.5 and 13.5 per cent.

The phosphorus compound $\beta$ is the iron carrier of the egg yolk; its physical and chemical properties are similar to those of the phosphorus compound $\alpha$. It contains about 3.5 per cent of iron, and therefore more than 7 times as much as the preparation of Hugounenq and Morel contains (Comptes rendus 140, page 1065 [1905]) and 12 times as much as the Haematogen of Bunge contains (Ztschr. f. Physiol. Chemie vol. 9, page 49 [1885]). The phosphorus content amounts to about 12 per cent and the atomic ratio of phosphorus to nitrogen is 1:2.

The phosphorus compound $\gamma$ is fundamentally different from $\alpha$ and $\beta$ compounds. It is very soluble in water, gives soluble alkali earth salts and insoluble heavy metal salts. Its phosphorus content amounts to about 8 per cent. The atomic ratio of phosphorus to nitrogen is 1:3. It gives the Biuret and Molisch reactions but not the Millon's reaction.

The phosphorus compound $\alpha$ amounts to about 55 per cent, the phosphorus compound $\beta$ to about 27 per cent, and the phosphorus compound $\gamma$ to about 18 per cent of the total phosphorus of the proteids of egg yolk.

The process according to this invention is based upon the following observations:—

(1) When alcohol is added, while stirring, to an aqueous solution of a mixture of the sodium salts of the three phosphorus compounds in egg yolk, which solution may be made by dissolving the sodium salts made as described in U. S. Patent No. 1,690,752, there is formed suddenly a flocculent precipitate which contains the compound $\beta$ containing iron.

(2) From a mixture of the sodium salts of the phosphorus compound $\alpha$ and phosphorus nucleus $\gamma$ soluble alkali earth salts precipitate the corresponding salt of the phosphorus compound $\alpha$ which is insoluble in water. The phosphorus compound $\gamma$ is not precipitated in this manner, since it yields alkali earth salts soluble in water.

(3) When an aqueous solution of a mixture of the sodium salts of the phosphorus compounds $\alpha$, $\beta$ and $\gamma$ is saturated with a neutral salt, for instance common salt, and mineral acid is added, the phosphorus compounds $\alpha$ and $\beta$ are precipitated while the phosphorus compound $\gamma$ remains in solution.

(4) The phosphorus compound $\gamma$ can be precipitated from its aqueous solution in the form of free acid or in the form of its alkali earth salt by addition of alcohol.

Example 1

10 kilos of egg yolk previously extracted with boiling alcohol, dried and finely ground, are suspended in 500 litres of water and there are added 2.8 kilos of concentrated hydrochloric acid and 100 grams of pepsin or of a corresponding quantity of hydrochloric acid extract of the mucous membrane of the stomach of a pig; the mixture is heated with constant stirring to 37–40° C. until the egg yolk has passed into solution. After about 10 hours 3.8 kilos of crystallized sodium acetate or 1½ kilos of crystallized sodium carbonate and 1 kilo of glacial acetic acid are added. After filtration, preferably in a filter press, the solid matter is washed with water and taken up with a solution of 1200 grams of anhydrous sodium carbonate in 40 litres of water, 100 grams of finely minced pancreas are added and the mixture is digested for 24–48 hours at 40° C. It is then slightly acidified with acetic acid, filtered from undissolved matter and mixed with lead acetate solution so long as a precipitate is produced. The lead precipitate is filtered, washed with water and stirred with a sodium carbonate solution of 20 per cent strength until the mixture shows a feeble red on phenolphthalein paper. The phosphorus compounds pass into solution in the form of sodium salts while the lead remains undissolved in the form of carbonate. The solution of the sodium salts is strongly concentrated in a vacuum, and then mixed with alcohol to produce a precipitate which is subsequently dried in a vacuum.

The mixture of the sodium salts of the three compounds containing phosphorous thus obtained is dissolved in 10 litres of water. To this solution 2½ to 3 litres of alcohol are added gradually with continuous stirring. There is formed suddenly a flocculent precipitate, which is filtered, re-dissolved in water, if necessary with addition of some sodium carbonate, again precipitated by adding alcohol, washed and dried in a vacuum. The sodium salt of the phosphorous compound $\beta$ is a yellowish powder, somewhat tardily soluble in water.

The solution of this salt may be converted by double decomposition with soluble alkali earth salts, or heavy metal salts, into the corresponding alkali earth salts or metal salts of the phosphorous compound $\beta$ which are insoluble in water, for instance the magnesium salt, calcium salt, iron salt or mercury salt.

The alcoholic filtrate from the phosphorous compound $\beta$ is freed from alcohol by distillation in a vacuum and mixed with a solution of calcium chloride or calcium acetate, whereby the calcium salt of phosphorous compound $\alpha$ is precipitated. The precipitate is filtered, washed with water and dried. The calcium salt thus obtained is a white powder insoluble in water and tasteless. By treatment with the calculated proportion of the sodium oxalate white hot, the calcium salt can be converted into the corresponding sodium salt, from which by double decomposition with a soluble alkali earth salt or heavy metal salt various alkali earth and heavy metal salts respectively may be made.

Finally, the filtrate from the calcium salt of the phosphorous compound $\alpha$ is either precipitated by means of alcohol in order to obtain the calcium salt in solid form or is precipitated by means of lead acetate and the precipitate decomposed with sulphuretted hydrogen; the lead sulphide is filtered, the excess of sulphuretted hydrogen expelled from the filtrate by a current of air and the solution precipitated with alcohol, the precipitate being washed with alcohol and dried in a vacuum. The white powder thus obtained is the phosphorous compound $\gamma$ in free condition.

From this powder, soluble in water by neutralization with an alkali, an alkali earth salt or a heavy metal salt, the corresponding salts can be obtained. The sodium salt of the phosphorous compound $\gamma$ can be obtained directly by treating the aforesaid precipitate produced by lead acetate with sodium carbonate solution.

It is obvious that for precipitating the phosphorous compound $\gamma$ another heavy metal salt may be substituted for the lead salt, for instance a salt of copper or mercury, and that for obtaining the alkali salt from the heavy metal salt another alkali compound may be used instead of soda, for instance potash.

Example 2

The mixture of sodium salts of the three phosphorous compounds obtained as described in Example 1 from 10 kilos of egg yolk extracted with boiling alcohol, is dissolved in 10 litres of water, the solution is saturated with common salt and 200 cc. of concentrated hydrochloric acid are added; the precipitate product is filtered and washed with water containing hydrochloric acid and subsequently with alcohol containing hydrochloric acid. This precipitate is a mixture of the phosphorous compound $\alpha$ and phosphorous compound $\beta$. It is dissolved in a suitable quantity of sodium carbonate solution and mixed, with constant stirring, with such a quantity of alcohol that a sudden precipitation occurs. This precipitate is the phosphorous compound $\beta$ and is further worked up as described in Example 1. The alcoholic filtrate containing the phosphorous compound $\alpha$ is either freed from alcohol and mixed with soluble alkali earth salt for precipitating the phosphorus compound as alkali earth salt or is poured into alcohol acidified with hydrochloric acid to precipitate the phosphorus compound in the form of free acid.

It is obvious that the ambit of this invention is not limited to the methods of separation specified in the examples, but includes any equivalent separation method, being based on the different solubilities of the three phosphorus compounds, be it in their free form, be it in form of their salts, in solvents, such as for instance water or alcohol.

What we claim is:—

1. A process for separating at least one of the three phosphorus compounds of the proteids contained in egg yolk by preparing an aqueous solution of a mixture of the alkali salts of the three phosphorus compounds, and precipitating from said solution by means of alcohol the alkali salt of the phosphorus compound $\beta$.

2. A process for separating at least one of the three phosphorus compounds of the proteids contained in egg yolk by preparing an aqueous solution of a mixture of the alkali salts of the three phosphorus compounds, precipitating from said solution by means of alcohol the alkali salts of the phosphorus compound $\beta$, filtering and treating the filtrate containing the mixture of the alkali salts of the phosphorus compounds $\alpha$ and $\gamma$ with a soluble alkali earth metal salt, thus precipitating the alkali earth metal salt of the phosphorus compound $\alpha$.

3. A process for separating at least one of the three phosphorus compounds of the proteids contained in egg yolk by preparing an aqueous solution of a mixture of the alkali salts of the three phosphorus compounds, precipitating from said solution by means of alcohol the alkali salt of the phosphorus compound $\beta$, filtering, treating the filtrate containing the mixture of the alkali salts of the phosphorus compounds $\alpha$ and $\gamma$ with a soluble alkali earth metal salt, whereby the alkali earth metal salt of the phosphorus compound $\alpha$ is precipitated, then filtering and isolating from the filtrate the phosphorus compound $\gamma$.

4. A process for separating at least one of the three phosphorus compounds of the proteids contained in egg yolk by preparing an aqueous solution of a mixture of the alkali salts of the three phosphorus compounds, precipitating from said solution by means of alcohol the alkali salt of the phosphorus compound $\beta$, filtering, treating the filtrate containing the mixture of the alkali salts of the phosphorus compounds $\alpha$ and $\gamma$ with a soluble alkali earth metal salt, whereby the alkali earth metal salt of the phosphorus compound $\alpha$ is precipitated, then filtering and precipitating from the filtrate the phosphorus compound $\gamma$ in form of its alkali earth metal salt by means of alcohol.

5. A process for separating at least one of the three phosphorus compounds of the proteids contained in egg yolk by preparing an aqueous solution of a mixture of the alkali salts of the three phosphorus compounds, precipitating from said solution by means of alcohol the alkali salt of the phosphorus compound $\beta$, filtering, treating the filtrate containing the mixture of the alkali salts of the phosphorus compounds $\alpha$ and $\gamma$ with a soluble alkali earth metal salt, whereby the alkali earth metal salt of the phosphorus compound $\alpha$ is precipitated, then filtering and precipitating the filtrate with a heavy metal salt, thus isolating the corresponding heavy metal salt of the phorphorus compound $\gamma$.

6. The phosphorus compound $\alpha$, which constitutes the main part of the mixture of the phosphorus compounds $\alpha$, $\beta$ and $\gamma$, obtained from the proteids of egg yolk, and forms a white powder, containing between 12.5 and 13.5 per cent of phosphorus, being but slightly soluble in cold water and insoluble in solutions of inorganic salts made acid with mineral acids, forming soluble alkali salts and insoluble alkali earth and heavy metal salts, giving the Biuret reaction but no Millon and Molisch reaction, and being useful for therapeutic purposes, for instance as a tonic.

7. The phosphorus compound $\beta$, obtained from the proteids of egg yolk, containing about 3.5 per cent of iron and about 12 per cent of phosphorus, forming alkali salts somewhat tardily soluble in water, and alkali earth and heavy metal salts difficultly soluble or insoluble in water, and being useful for therapeutic purposes, for instance as a tonic.

8. The phosphorus compound $\gamma$, obtained from the proteids of egg yolk, containing about 8 per cent of phosphorus, being very easily soluble in water, giving soluble alkali and alkali earth metal salts, and insoluble heavy metal salts, yielding the Biuret and Molisch reaction but not the Millon's reaction, and being useful for therapeutic purposes, for instance as a tonic.

In witness whereof we have hereunto signed our names this 7th day of March 1927.

SWIGEL POSTERNAK.
THÉODORE POSTERNAK.